March 3, 1953 L. B. COURTOT 2,630,290
PACKLESS VALVE STEM ASSEMBLY
Filed Dec. 10, 1948
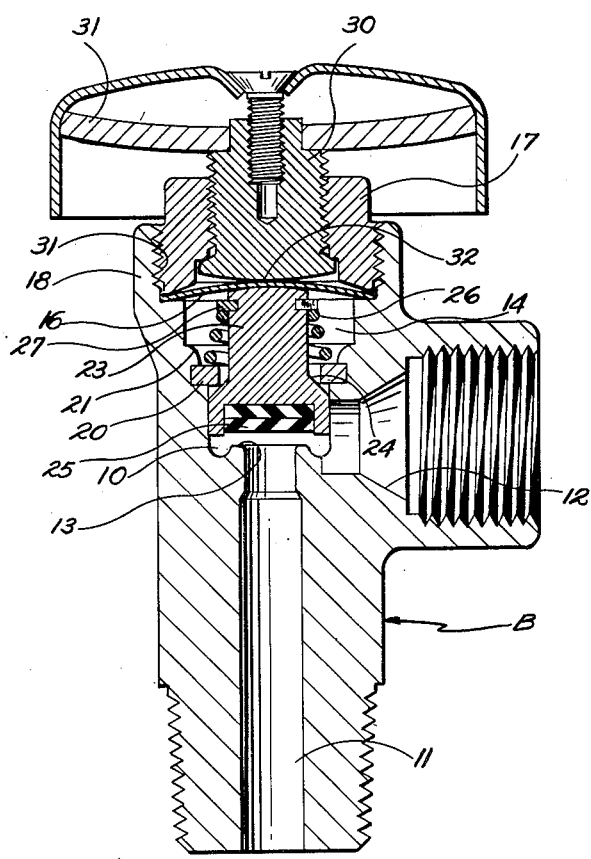
INVENTOR.
LOUIS B. COURTOT
BY Richey & Watts
ATTORNEYS Patented Mar. 3, 1953

2,630,290

UNITED STATES PATENT OFFICE 2,630,290

PACKLESS VALVE STEM ASSEMBLY

Louis B. Courtot, Cleveland, Ohio, assignor to The Weatherhead Company, Cleveland, Ohio, a corporation of Ohio Application December 10, 1948, Serial No. 64,573

1 Claim. (Cl. 251—31)

This invention relates to packless valves and more particularly to a packless valve having a back seat for the stem assembly.

It is an object of the invention to facilitate making a packless valve having a back seat compact, and to simplify the general construction of such a valve. This is accomplished by mounting a conical valve-opening spring between the back seat and a snap ring fitted to the outer end of the stem.

Another feature resides in forming and assembling the element forming the back seat in such a manner that the height of the valve need not be increased in order to accommodate the back seat member.

The manner in which these objects and advantages are attained will be understood from the following detailed description of a preferred embodiment of the invention.

In the drawings:

Fig. 1 is a sectional view of a valve embodying the invention.

The valve body B has formed therein a valve chamber 10, inlet passageway 11 leading thereto, and outlet passageway 12 leading therefrom. The usual valve seat 13 is provided between the passageways. Spaced from the valve chamber 10 is a supplemental chamber 14 closed by a diaphragm 16 that is retained by an annular nut 17 threaded into a nipple 18 on the valve body.

A back seat element 20 is provided between the chambers and is retained in place by spinning over a lip part 21 formed in the material of the valve body.

Disposed in supplemental chamber 14 is a valve member having a stem 23, a conical sealing portion 24 for engagement with the back seat, and a seal or main closure element 25 for engagement with valve seat 13. The valve stem is urged toward the open position and into engagement with the back seat by a conical spring 26 mounted between the back seat element 20 and a snap ring 27 mounted in a groove at the outer end of the stem.

Valve operating means are provided which may comprise a threaded plug or button 30 and a handle 31, the plug being threaded into threads 31 formed in the diaphragm clamp nut 17. A rounded surface 32 engages the diaphragm and acts to close the valve through the diaphragm. The nut 17 may be removed for replacement of the diaphragm.

The construction wherein the snap ring 27 forms the outer spring seat greatly simplifies the construction and permits the valve body to be made shorter with a considerable saving in material. The same advantages flow from the mounting of the other spring seat, that is, the construction wherein back seat element 20 is spun into the valve body. In the broader aspects of the invention the back seat need not be spun in place but could be threaded into the body, but the preferred construction is that illustrated.

Having completed a detailed description of a preferred embodiment of the invention, I contemplate that the appended claim and not the aforesaid embodiment be determinative of the scope of the invention.

What is claimed is:

In a valve, a valve body having a valve chamber therein and inlet and outlet passageways, a valve seat in said chamber and between said passageways, a supplemental chamber in said body spaced from said valve chamber, a narrow groove formed in said body between said chambers having a deformable lip in said supplemental chamber, a back seat member disposed in said groove with said lip pressing against the back seat member, a valve member having a stem disposed in said supplemental chamber and extending through said back seat, a closure integral with said stem and having opposed sealing means for alternate engagement with said seats, an imperforate diaphragm closing off said supplemental chamber, a snap ring disposed on the outer end portion of said stem, a conical spring extending between said back seat and said snap ring, and operating means for the valve stem above the diaphragm.

LOUIS B. COURTOT.

REFERENCES CITED

The following references are of record in the file of this patent:

UNITED STATES PATENTS

| Number | Name | Date |
|---|---|---|
| 1,238,334 | Raub | Aug. 28, 1917 |
| 1,890,505 | Forbes | Dec. 13, 1932 |
| 2,001,251 | Irving | May 14, 1935 |
| 2,061,028 | Forbes | Nov. 17, 1936 |
| 2,359,992 | Johnson | Oct. 10, 1944 |
| 2,371,432 | Di Pietro | Mar. 13, 1945 |
| 2,382,235 | Lamar | Aug. 14, 1945 |